(12) United States Patent
Noh et al.

(10) Patent No.: US 9,062,146 B2
(45) Date of Patent: *Jun. 23, 2015

(54) OLEFIN BLOCK COPOLYMER

(75) Inventors: Kyung-Seop Noh, Daejeon (KR); Won-Hee Kim, Daejeon (KR); Nan-Young Lee, Seoul (KR); Sang-Jin Jeon, Daejeon (KR); Sang-Eun An, Daejeon (KR)

(73) Assignee: LG CHEM, LTD., Seoul (KR)

( * ) Notice: Subject to any disclaimer, the term of this patent is extended or adjusted under 35 U.S.C. 154(b) by 74 days.

This patent is subject to a terminal disclaimer.

(21) Appl. No.: 13/980,870

(22) PCT Filed: Jan. 20, 2012

(86) PCT No.: PCT/KR2012/000564
§ 371 (c)(1),
(2), (4) Date: Jul. 19, 2013

(87) PCT Pub. No.: WO2012/099443
PCT Pub. Date: Jul. 26, 2012

(65) Prior Publication Data
US 2013/0296517 A1    Nov. 7, 2013

(30) Foreign Application Priority Data

Jan. 20, 2011 (KR) ................. 10-2011-0006050
Jan. 21, 2011 (KR) ................. 10-2011-0006437
Jan. 21, 2011 (KR) ................. 10-2011-0006438

(51) Int. Cl.
*C08F 210/16* (2006.01)
*C08F 297/08* (2006.01)
*C08F 301/00* (2006.01)
*C08F 4/659* (2006.01)
*C08F 4/6592* (2006.01)

(52) U.S. Cl.
CPC .......... *C08F 297/083* (2013.01); *C08F 301/00* (2013.01); *C08F 2500/10* (2013.01); *C08F 210/16* (2013.01); *C08F 4/65908* (2013.01); *C08F 4/6592* (2013.01); *C08F 2410/01* (2013.01)

(58) Field of Classification Search
CPC ... C08F 2500/10; C08F 301/00; C08F 210/16
See application file for complete search history.

(56) References Cited

U.S. PATENT DOCUMENTS

2009/0324914 A1   12/2009   Liang et al.
2011/0003524 A1    1/2011   Claasen et al.

FOREIGN PATENT DOCUMENTS

CN       101405311 A     4/2009
KR    10-2007-0112192    11/2007

(Continued)

*Primary Examiner* — Richard A Huhn
(74) *Attorney, Agent, or Firm* — McKenna Long & Aldridge LLP

(57) ABSTRACT

The present description relates to an olefin block copolymer having excellences in elasticity, heat resistance, and processability. The olefin block copolymer includes a plurality of blocks or segments, each of which includes an ethylene or propylene repeating unit and an α-olefin repeating unit at different weight fractions. In the olefin block copolymer, a first derivative of the number Y of short-chain branches (SCBs) per 1,000 carbon atoms of each polymer chain contained in the block copolymer with respect to the molecular weight X of the polymer chains is a negative or positive number of $-1.5 \times 10^{-4}$ or greater; and the first derivative is from $-1.0 \times 10^{-4}$ to $1.0 \times 10^{-4}$ in the region corresponding to the median of the molecular weight X or above.

19 Claims, 3 Drawing Sheets

(56) References Cited

FOREIGN PATENT DOCUMENTS

| KR | 10-2010-0037707 A | 4/2010 |
|----|-------------------|--------|
| KR | 10-2010-0104564   | 9/2010 |
| KR | 10-2010-0126712   | 12/2010 |
| WO | 2009097565 A1     | 8/2009 |
| WO | WO 2010-039628    | 4/2010 |
| WO | WO 2011-010891    | 1/2011 |

OLEFIN BLOCK COPOLYMER

This application is a National Phase Entry of International Application No. PCT/KR2012/000564, filed Jan. 20, 2012, and claims priority to and the benefit of Korean Patent Application Nos. 10-2011-0006050, filed Jan. 20, 2011, 10-2011-0006437, filed Jan. 21, 2011, and 10-2011-0006438, filed Jan. 21, 2011, the disclosures of which are incorporated herein by reference in their entirety.

TECHNICAL FIELD

The present invention relates to an olefin block copolymer.

BACKGROUND

A block copolymer refers to a copolymer consisting of a plurality of blocks or segments of repeating units distinct in characteristics from one another. It tends to be superior in characteristics to typical random copolymers or polymer blends. For example, the block copolymer may include both of soft elastic blocks (referred to as "soft segments") and hard crystalline blocks (referred to as "hard segments,") and thus have good properties, such as excellent elasticity and heat resistance. More specifically, such a block copolymer has elasticity at a temperature equal to or higher than the glass transition temperature of the soft segments and shows a thermoplastic behavior at a temperature higher than the melting temperature, so it can have relatively good heat resistance.

A specific example of the block copolymer, SBS (styrene-butadiene-styrene) triblock copolymers and their hydrogenated versions (e.g., SEBS) are known for their usefulness in a variety of applications since they have good characteristics regarding heat resistance and elasticity.

Recently, the use of olefin-based elastomers, which are a copolymer of ethylene/propylene and α-olefin, has been intensively under consideration. More specifically, many attempts have been made to use the olefin-based elastomers in a variety of applications, such as for use purposes as a substitute for rubber materials. For further improvement on the heat resistance of the olefin-based elastomers, there has been an attempt to use block copolymer type elastomers in place of the conventional random copolymer type olefin-based elastomers such as ethylene-α-olefin random copolymers.

In spite of those attempts, however, the study for commercialization of olefin-based elastomers with enhanced heat resistance has already reached its limit. Moreover, the conventional block copolymer type olefin-based elastomers also encounter a limitation in that they are susceptible to deterioration of processability during the melt processing. Accordingly, there have been consistent demands for olefin-based elastomers with enhanced heat resistance and processability.

SUMMARY

It is an object of the present invention to provide an olefin block copolymer with good elasticity, heat resistance, and processability.

In accordance with an embodiment of the present description, there is provided an olefin block copolymer that comprises a plurality of blocks or segments, each comprising an ethylene or propylene repeating unit and an α-olefin repeating unit at different weight fractions, where a first derivative of the number Y of short-chain branches (SCBs) per 1,000 carbon atoms of each polymer chain contained in the block copolymer with respect to the molecular weight X of the polymer chain is a negative or positive number of $-1.5 \times 10^{-4}$ or greater; and the first derivative is from $-1.0 \times 10^{-4}$ to $1.0 \times 10^{4}$ in a region corresponding to the median of the molecular weight X or above.

In the block copolymer according to the embodiment, the first derivative may be greater in a region below the median of the molecular weight X than in the region corresponding to the median of the molecular weight X or above. The first derivative may decrease with an increase in the molecular weight X in the region below the median of the molecular weight X. Further, the first derivative may range from about $2.0 \times 10^{-4}$ to 0.1 in a region where the molecular weight X is in the bottom less than 40%.

Further, the olefin block copolymer may be provided so that the number Y of short-chain branches (SCBs) per 1,000 carbon atoms of each polymer chain is about 70 or less. The number Y of short-chain branches (SCBs) per 1,000 carbon atoms of each polymer chain may range from about 20 to 70 in the region corresponding to the median of the molecular weight X or above, and the deviation of the maximum and minimum values for Y in the region may be about 20 or less.

The olefin block copolymer according to the embodiment may comprise a hard segment comprising a first weight fraction of the α-olefin repeating unit and a soft segment comprising a second weight fraction of the α-olefin repeating unit, where the second weight fraction is greater than the first weight fraction. Further, the weight fraction of the α-olefin repeating unit contained in the entire block copolymer may have a value between the first and second weight fractions.

In the olefin block copolymer according to the embodiment, the content Y' (wt. %) of the hard segment and the content X' (wt. %) of the ethylene or propylene repeating unit in the block copolymer satisfy the following Mathematical Formula 1. Further, the olefin block copolymer may comprise about 50 to 90 wt. % of the ethylene or propylene repeating unit and a remaining content of the α-olefin repeating unit and satisfy the Mathematical Formula 1 in terms of the entire content range of the repeating units:

$$Y' \geq 2.8495 X' - 145.01 \quad \text{[Mathematical Formula 1]}$$

Further, the block copolymer according to the embodiment may comprise about 10 to 90 wt. % of the hard segment and a remaining content of the soft segment. In this regard, the hard segment may have a higher value than the soft segment in at least one property of the degree of crystallization, density, and melting temperature.

The block copolymer according to the embodiment may have a density of about 0.85 to 0.92 g/cm$^3$, and a value of thermal mechanical analysis (TMA) of about 70 to 140° C. Further, the block copolymer may have a melt index of about 0.5 to 5 g/10 min under a load of 2.16 kg at 190° C., and a Shore hardness of about 50 to 100.

In addition, the block copolymer according to the embodiment may have a permanent recovery (after 300% elongation) of about 110% or less, and a melting temperature of about 100° C. to 140° C. The block copolymer may have a weight average molecular weight of about 50,000 to 200,000 and a molecular weight distribution of about 2.0 to 4.5.

In the olefin block copolymer, the α-olefin repeating unit may be a repeating unit derived from at least one α-olefin selected from the group consisting of 1-butene, 1-pentene, 4-methyl-1-pentene, 1-hexene, 1-heptene, 1-octene, 1-decene, 1-undecene, 1-dodecene, 1-tetradecene, 1-hexadecene, and 1-itocene.

DETAILED DESCRIPTION OF THE EMBODIMENTS

Figure 1:
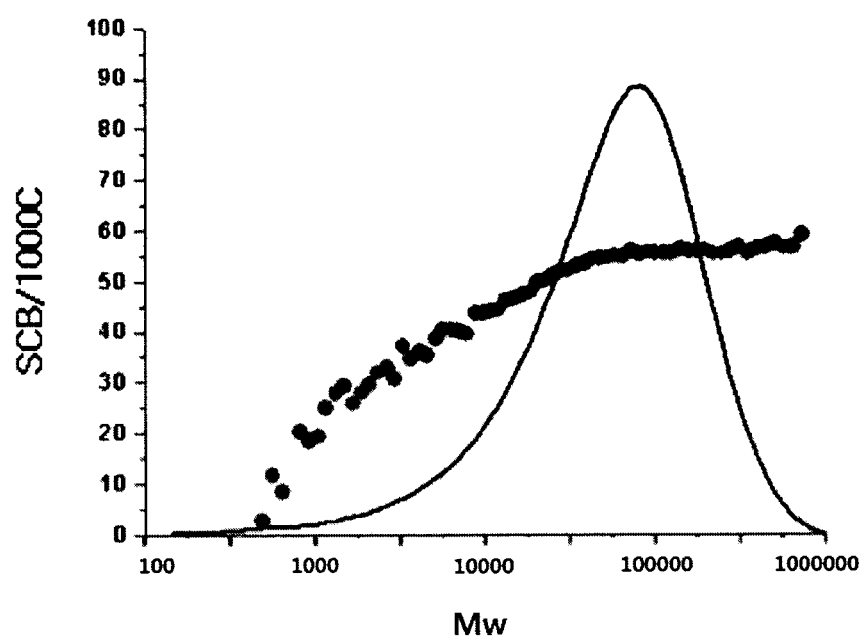
FIG. 1 shows a molecular distribution curve of an olefin block copolymer prepared in one Example and the distribution of the number of short-chain branches (SCBs) per 1,000 carbon atoms.

Hereinafter, a detailed description will be given as to the olefin block copolymer according to the embodiments of the present description and the production method thereof. However, these embodiments are provided as a mere illustration and not intended to limit the scope of the invention. Moreover, it is apparent to those skilled in the art that the embodiments may be modified in many ways.

Unless stated otherwise, some terms as used in the entire specification may be defined as follows.

The term "(olefin) block copolymer" as used herein refers to a copolymer of ethylene or propylene and α-olefin, where the copolymer comprises a plurality of blocks or segments of repeating units that are distinguishable from one another in terms of at least one property of, for example, the content (weight fraction) of the repeating unit derived from ethylene (or propylene), the content (weight fraction) of the repeating unit from α-olefin, the degree of crystallization, density, or melting temperature.

A plurality of such blocks or segments may comprise, for example, an ethylene or propylene repeating unit and an α-olefin repeating unit, on the condition that the contents (weight fractions) of the repeating units are different from each other. For example, a plurality of the blocks or the segments may comprise a hard segment which is a hard crystalline block comprising a first weight fraction of the α-olefin, and a soft segment which is a soft elastic block comprising a second weight fraction of the α-olefin, where the second weight fraction is greater than the first weight fraction. In this regard, the first weight fraction may be lower than the weight fraction of the α-olefin repeating unit as measured for the entire block copolymer, while the second weight fraction may be higher than the weight fraction of the α-olefin repeating unit for the entire block copolymer.

In addition, a plurality of the blocks or segments may be distinguishable from one another in terms of at least one property selected from the degree of crystallization, density, and melting point. In comparison with the soft segment which is a soft elastic block, for example, the hard segment which is a hard crystalline block may have a higher value in terms of at least one or two properties of the degree of crystallization, density, and melting temperature.

The term "polymer chain(s)" included in the "(olefin) block copolymer" refers to a number of polymer chains formed by the polymerization and production of the block copolymer. For example, when the block copolymer is prepared by polymerizing ethylene or propylene with α-olefin, a number of polymer chains containing an ethylene or propylene repeating unit and an α-olefin repeating unit and having different molecular weights are formed to constitute the block copolymer. The molecular weights and the contents of the polymer chains can be determined from a curve plotting the molecular weight distribution of the block copolymer measured by gel permeation chromatographic (GPC) analysis. These polymer chains are defined as "polymer chain(s)" contained in the "(olefin) block copolymer".

The term "median of the molecular weight" for the "polymer chain(s)" refers to the molecular weight of a polymer chain that is the $50^{th}$ percentile when the polymer chains contained in the block copolymer are arranged in value order of the molecular weight from lowest to highest. The expression "the molecular weight of the polymer chain is in the bottom A % or less (or greater) or in the bottom less (or greater) than A %" means that its molecular weight is equal to and/or less (or greater) than the molecular weight of a polymer chain which is the $A^{th}$ percentile from the lowest when the polymer chains are arranged in value order of the molecular weight from lowest to highest (for example, the polymer chain having the $4^{th}$ lowest molecular weight out of 10 polymer chains, if A % is 40%). Similarly, the expression "the molecular weight of the polymer chain is in the top A % or less (or greater) or in the top less (or greater) than A %" means that its molecular weight is equal to and/or less (or greater) than the molecular weight of a polymer chain which is the $A^{th}$ percentile from the highest when the polymer chains are arranged in value order of the molecular weight from lowest to highest.

The term "short-chain branch (SCB)" in the "(olefin) block copolymer" refers to a chain branching from the longest main chain in each of the polymer chains. The number of the short-chain branches (SCBs) can be determined from the FT-IR analysis of the block copolymer and proportional to the content of α-olefin monomers contained in the block copolymer or the polymer chains.

In accordance with one embodiment of the present invention, there is provided an olefin block copolymer that comprises a plurality of blocks or segments, each comprising an ethylene or propylene repeating unit and an α-olefin repeating unit at different weight fractions, where a first derivative (hereinafter, denoted by dY/dX) of the number Y of short-chain branches (SCBs) per 1,000 carbon atoms of each polymer chain contained in the olefin block copolymer with respect to the molecular weight X of the polymer chains is a negative or positive number of about $-1.5 \times 10^{-4}$ or greater; and the first derivative is about $-1.0 \times 10^{-4}$ to $1.0 \times 10^{-4}$, about $-9.0 \times 10^{-5}$ to $9.0 \times 10^{-5}$, about $-8.0 \times 10^{-5}$ to $8.0 \times 10^{-5}$, about $-6.5 \times 10^{-5}$ to $7.0 \times 10^{-5}$, or about $-6.0 \times 10^{-5}$ to $6.8 \times 10^{-5}$ in the region corresponding to the median of the molecular weight X or above.

The olefin block copolymer of the embodiment is prepared by copolymerization of ethylene or propylene with α-olefin, so it comprises repeating units derived from ethylene or propylene and α-olefin and thus benefits from the inclusion of the α-olefin repeating unit derived from α-olefin to have good elasticity.

As the olefin block copolymer is prepared using the aftermentioned specific catalyst system, it may satisfy the characteristic that a first derivative of the number Y of short-chain branches (SCBs) per 1,000 carbon atoms of each polymer chain contained in the block copolymer with respect to the molecular weight X of the polymer chains is a negative or positive number of about $-1.5 \times 10^{-4}$ or greater, from about 0 or greater, or from about $-1.5 \times 10^{-4}$ to 1. Particularly, the first derivative is about $-1.0 \times 10^{-4}$ to $1.0 \times 10^{-4}$, about $-9.0 \times 10^{-5}$ to $9.0 \times 10^{-5}$, about $-8.0 \times 10^{-5}$ to $8.0 \times 10^{-5}$, about $-6.5 \times 10^{-5}$ to $7.0 \times 10^{-5}$, or about $-6.0 \times 10^{-5}$ to $6.8 \times 10^{-5}$ in the region where the molecular weight X is the median or greater; in the bottom about 55% or greater; in the bottom about 60 to 100%; or in the bottom about 70 to 95%.

The characteristic of the block copolymer that the first derivative value is a negative or positive number of about $-1.5 \times 10^{-4}$ or greater implies that the block copolymer contains an equal or greater number of short-chain branches (even if it decreases in a limited region, the decrement is insignificant) with an increase in the molecular weight of the polymer chains, which renders the content of the α-olefin repeating unit constant or approximately proportionate to the molecular weight of the polymer chain. Further, the characteristic of the block copolymer that the first derivative value has such a low value approximately ranging from $-1.0 \times 10^{-4}$ to $1.0 \times 10^{-4}$ in the region corresponding to the median of the molecular weight X or above implies that when the polymer chains of the block copolymer have a relatively high molecular weight, there is almost no increase in the number of SCBs and the content range of the α-olefin repeating unit determined from the number of SCBs even with an increase in the molecular weight, and that each polymer chain can have a constant content of the α-olefin repeating unit. This reflects the fact that the polymer chains with relatively high molecular weight contains blocks or segments of the α-olefin repeating unit.

Such characteristics of the block copolymer presumably results from the fact that because the block copolymer is prepared in the presence of the after-mentioned specific catalyst system, it may have a blocked form of a plurality of blocks or segments distinct in physical or chemical characteristics from one another. In other words, the block copolymer according to one embodiment as prepared by using the after-mentioned specific catalyst system consists of a block or segment formed by polymerization and coupling of ethylene or propylene monomers of the same kind, and a second block or segment formed by polymerization and coupling of α-olefins of the same kind. As a result, the block copolymer according to the embodiment can exhibit a relatively high degree of blocking in the region where the molecular weight is relatively high, and consequently, each polymer chain has the constant number of short-chain branches with a constant content of the α-olefin repeating unit and acquires the aforementioned characteristics.

More specifically, such a block copolymer may include a plurality of blocks or segments of an ethylene or propylene repeating unit and an α-olefin repeating unit at different weight fractions. For example, the block copolymer may comprise hard segments which are hard crystalline blocks comprising a first weight fraction of the α-olefin repeating unit, and soft segments which are soft elastic blocks comprising a second weight fraction of the α-olefin repeating unit. In this regard, the weight fraction of the α-olefin repeating unit included in the entire block copolymer has a value between the first and second weight fractions. In other words, the first weight fraction can be lower than the weight fraction of the α-olefin repeating unit calculated for the entire block copolymer, while the second weight fraction is higher than the weight fraction of the α-olefin repeating unit calculated for the entire block copolymer.

In this manner, the olefin block copolymer of the embodiment has such a blocked form as can be seen from the aforementioned distribution characteristic of the short-chain branches. In particular, as the block copolymer includes hard segments of the hard crystalline blocks with higher weight fraction of the ethylene or propylene repeating unit, it has higher values of TMA (Thermal Mechanical Analysis) than the conventional olefin-based elastomers at the same density level. In addition, the block copolymer of the embodiment has a high melting temperature Tm of about 100 to 140° C., about 110 to 130° C., or about 120 to 130° C. Thus, the block copolymer of the embodiment may show excellent properties such as good elasticity as an elastomer even at higher temperature, consequently with enhanced heat resistance. Particularly, the block copolymer of the embodiment can exhibit enhanced heat resistance as it has a high degree of blocking in the region where the molecular weight is relatively high that much more affects the properties of the block copolymer (in other words, as the polymer chains with a relatively high molecular weight exhibits a high degree of blocking). Further, the block copolymer also shows enhanced elasticity due to the inclusion of the soft segments that comprise the α-olefin repeating units at higher weight fraction.

Accordingly, the olefin block copolymer of the embodiment can exhibit enhanced heat resistance as well as good elasticity pertaining to copolymerization of α-olefin, making it possible to provide olefin-based elastomers with good elasticity and heat resistance. Therefore, such an olefin block copolymer can be used as a substitute for rubber materials to overcome the limit of the conventional olefin-based elastomers in regards to the range of applications and enable commercialization of the olefin-based elastomers useful in a wider range of fields.

On the other hand, a plurality of blocks or segments contained in the block copolymer of the embodiment, such as, for example, hard segments and soft segments are distinguishable from one another by at least one of the properties of the degree of crystallization, density, or melting temperature. For example, the hard segment which is the hard crystalline block comprising an ethylene or propylene repeating unit at higher weight fraction may have a higher value in at least one property of the degree of crystallization, density, melting point, and the like, in comparison with the soft segment which is the soft elastic block comprising an α-olefin repeating unit at higher weight fraction. This presumably results from the higher crystallinity of the hard segments. Such blocks or segments can be characterized and/or classified by preparing a (co)polymer corresponding to each block or segment and measuring its characteristics.

The block copolymer of the embodiment is characterized by that the first derivative may be greater in the region where the molecular weight of the polymer chains contained in the block copolymer is less than the median of the molecular weight than in the region where the molecular weight of the polymer chains is equal to or greater than the median of the molecular weight. Further, the first derivative decreases with an increase in the molecular weight in the region where the molecular weight of the polymer chains is less than the median of the molecular weight. For example, the block copolymer of the embodiment may have the highest value of the first derivative at the point where the molecular weight of the polymer chains is the minimum, and the first derivative decreases with an increase in the molecular weight of the polymer chains contained in the block copolymer. In one specific example, the first derivative can be about $2.0 \times 10^{-4}$ to 0.1, about $3.0 \times 10^{4}$ to 0.08, or about $5.0 \times 10^{-4}$ to 0.06 in the region where the molecular weight is in the bottom less than about 40%, or in the bottom less than about 35% and 0% or greater, or in the bottom less than about 30% and 0% or greater.

While the block copolymer of the embodiment has a blocked form of polymer chains each comprising approximately a constant content of short-chain branches in the region where the molecular weight is relatively high, the number of short-chain branches increases more greatly with an increase in the molecular weight of the polymer chains in the region where the molecular weight is relatively low, but the increment of the number of the short-chain branches relatively decreases with an increase in the molecular weight. Particularly, the first derivative has a considerably higher value up to about 0.1 at maximum in the region where the molecular weight of the polymer chain is in the bottom less than 40% than in the region corresponding to the median of the molecular weight or above.

Such a great increment in the number of short-chain branches in proportion to the molecular weight shows that each polymer chain contains the α-olefin repeating unit in the content range proportional to the molecular weight, which reflects the fact that the polymer chains with a relatively low molecular weight have characteristics similar to those of random copolymers. As the block copolymer of the embodiment contains polymer chains with a relatively low molecular that are similar in characteristics to random copolymers, the molecular weight distribution of the block copolymer may increase. Further, such a block copolymer has a great drop in the melt viscosity during the melt processing and thus exhibits superiority in melt processability and product formability to the conventional block copolymers. Accordingly, the block copolymer of the embodiment enables the production of olefin-based elastomers with enhanced processability in addition to good elasticity and heat resistance.

Further, the number of short-chain branches (SCBs) per 1,000 carbon atoms of each polymer chain contained in the block copolymer of the embodiment may be about 70 or less, greater than about 0 and about 65 or less, or greater than about 3 and about 61 or less. In the region where the polymer chains have a molecular weight corresponding to the median or above, the number of short-chain branches (SCBs) per 1,000 carbon atoms of each polymer chain may be about 20 to 70, about 25 to 50, about 35 to 60, about 45 to 65, or about 40 to 60. In this regard, the deviation of the maximum and minimum values for Y in the region may be about 20 or less, about 19 or less, about 5 to 18, or about 7 to 17. As such, the number of short-chain branches contained in each polymer chain can be relatively constant irrespective of the molecular weight of the polymer chain in the region corresponding to the median of the molecular weight or above.

As the block copolymer contains short-chain branches to a constant level in the region where the polymer chains have a relatively high molecular weight, it can have a higher degree of blocking in the region where the polymer chains have a relatively high molecular weight. Such a high degree of blocking on the high-molecular-weight region that has a great influence on the properties of the block copolymer (that is, a high degree of blocking of the polymer chains with high molecular weight among the polymer chains contained in the block copolymer) enables the block copolymer of the embodiment to exhibit more excellences in heat resistance and elasticity.

The block copolymer of the embodiment may be characterized by that the content Y' (wt. %) of the hard segment and the content X' (wt. %) of the ethylene or propylene repeating unit in the block copolymer satisfy the following Mathematical Formula 1:

$$Y' \geq 2.8495X' - 145.01 \quad \text{[Mathematical Formula 1]}$$

More specifically, the content Y' (wt. %) of the hard segment and the content X' (wt. %) of the ethylene or propylene repeating unit in the block copolymer satisfy the following Mathematical Formula 1a, and one specific example of the block copolymer meets the equation as given by Y=2.4143X−113.23 ($R^2$=9878) (Refer to the following Examples):

$$2.8495X' - 81.45 \geq Y' \geq 2.8495X' - 145.01 \quad \text{[Mathematical Formula 1a]}$$

This characteristic implies that the block copolymer has a high content of the hard segment even when a same amount of ethylene or propylene is used to copolymerize. This also shows that the block copolymer includes a hard segment formed from polymerization and coupling of the ethylene or propylene monomers of a same kind and a soft segment formed from polymerization and coupling of the α-olefin monomers of a same kind and thus exhibits a higher degree of blocking than the conventional olefin-based elastomers. Such a higher degree of blocking renders the block copolymer of the embodiment to show more enhanced heat resistance.

In the Mathematical Formula 1, the content Y' (wt. %) of the hard segment and the content X' (wt. %) of the ethylene or propylene repeating unit can be measured by the respective measurement methods as given below, and the measurement results are used to determine the characteristics according to the Mathematical Formula 1 through linear regression analysis.

Figure 3:
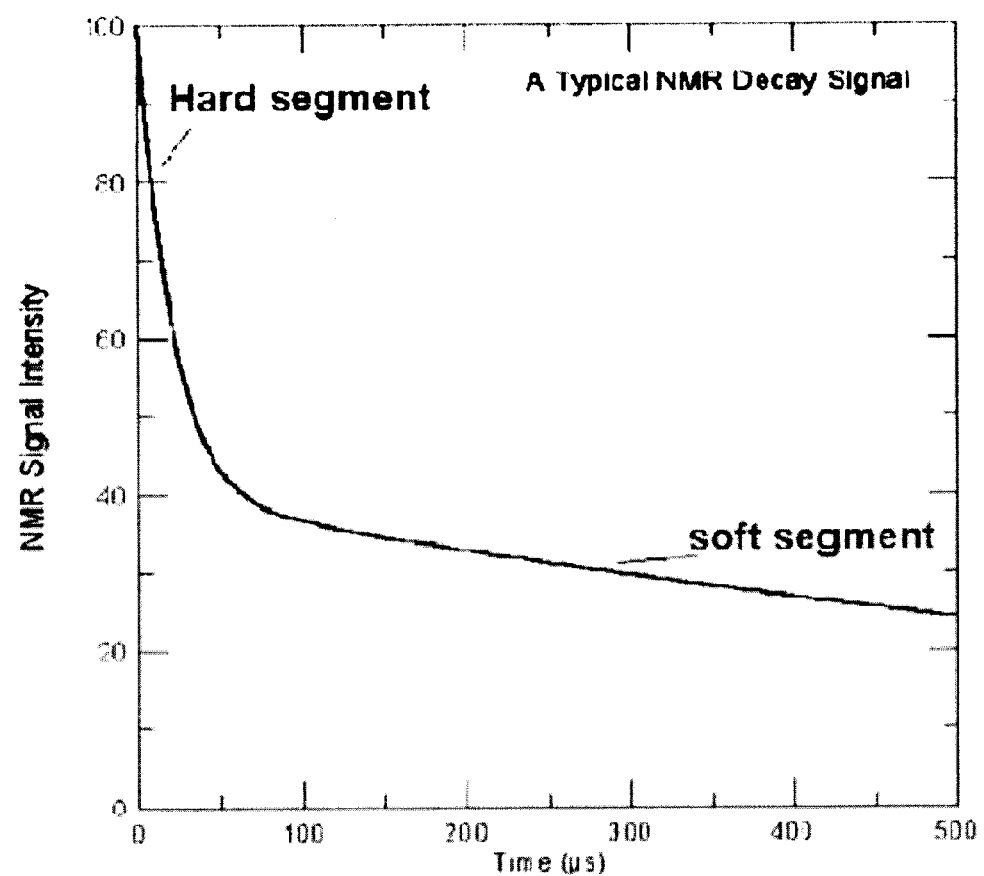
FIG. 3 is a diagram showing an example of FID (Free Induction Decay) determined to measure the content (wt. %) of the hard segment contained in the olefin block copolymer in Experimental Example 2.

First, the content Y' (wt. %) of the hard segment is calculated with a time domain NMR (TD NMR) instrument commercially available. More specifically, the TD NMR instrument is used to determine the free induction decay (FID) for a sample of the block copolymer, where the FID is expressed as a function of time and intensity. An example that shows the measurement results expressed as a function is depicted in FIG. 3. According to the following Mathematical Formula 2, four constants, A, B, $T2_{fast}$, and $T2_{slow}$ are varied to elicit a functional formula most approximating the graph of the above-mentioned FID function and thereby to determine the values for the sample, such as A, B, $T2_{fast}$, and $T2_{slow}$. For reference, the T2 (spin-spin relaxation time) relaxation for the hard segment as calculated from the functional formula appears fast, while the T2 relaxation for the soft segment is slow. Among the calculated values of A, B, $T2_{fast}$, and $T2_{slow}$, the lower T2 value is determined as the T2 value of the hard segment, that is, $T2_{fast}$, while the higher T2 value is determined as the T2 value of the soft segment, that is, $T2_{slow}$. This process enables it to calculate the content (wt. %) of the hard segment as well as the constants of A and B.

$$\text{Intensity} = A \times \text{EXP}(-\text{Time}/T2_{fast}) + B \times \text{EXP}(-\text{Time}/T2_{slow}) \quad \text{[Mathematical Formula 2]}$$

Determine A, B, $T2_{fast}$, and $T2_{slow}$ by fitting.

Hard segment (wt.%)=A/(A+B)×100

In the Mathematical Formula 2, intensity and time are values calculated through the FID analysis; $T2_{fast}$ is the T2 (spin-spin relaxation time) relaxation value for the hard segment; and $T2_{slow}$ is the T2 (spin-spin relaxation time) relaxation value for the soft segment. A and B, which are constants determined by the fitting process, indicate the relative proportions of the hard and soft segments, respectively, and have values proportionate to the contents of the respective segments.

The content X' (wt. %) of the ethylene or propylene repeating unit contained in the block copolymer can determined in consideration of the content of the ethylene or propylene monomer used in the copolymerization, or calculated through $^1$H-NMR analysis of the block copolymer.

For a plurality of block copolymers prepared by using different amounts of the ethylene or propylene monomer under the same conditions of polymerization, the above-specified methods are adopted to measure the content Y' (wt. %) of the hard segment and the content X' (wt. %) of the ethylene or propylene repeating unit and elicit the relationship between the two contents X' and Y'. An exemplary illustration showing the relationship between X' and Y' is presented in FIG. 2. The relationship between X' and Y' is used to acquire a relational formula corresponding to the Mathematical Formula 1 through linear regression analysis and to determine whether the copolymer satisfies the Mathematical Formula 1.

In a more specific example, the block copolymer of the embodiment may comprise about 50 to 90 wt. %, about 50 to 85 wt. %, or about 55 to 80 wt. % of the ethylene or propylene repeating unit and a remaining content (i.e., about 10 to 50 wt. %, about 15 to 50 wt. %, or about 20 to 45 wt. %) of the α-olefin repeating unit. As the block copolymer includes the above-defined content of the α-olefin repeating unit, it may exhibit good elasticity, which brings about the properties required to an elastomer. Each block or segment is properly defined or blocked, so the block copolymer can have more excellent heat resistance.

In addition, the block copolymer of the embodiment does not fail to satisfy the relationship as defined by the Mathematical Formula 1 in terms of the entire content range of the repeating units. As a result, the block copolymer can exhibit a higher degree of blocking and thus more excellent heat resistance in the entire range where it substantially has characteristics as an elastomer.

The block copolymer may comprise about 10 to 90 wt. %, about 14 to 85 wt. %, or about 25 to 80 wt. % of the hard segment and a remaining content (i.e., about 10 to 90 wt. %, about 15 to 86 wt. %, or about 20 to 75 wt. %) of the soft segment.

As described above, among a plurality of blocks or segments constituting the block copolymer, the hard segment means a hard crystalline segment having a higher content of the ethylene or propylene repeating unit and contributes to the excellent heat resistance of the block copolymer. The soft segment means a soft elastic segment having a higher content of the α-olefin repeating unit and contributes to the elasticity of the block copolymer. As the block copolymer of the embodiment comprises the hard and soft segments in the defined content range, it can exhibit excellent heat resistance and adequate elasticity as an elastomer.

The block copolymer of the embodiment may have a thermal mechanical analysis (TMA) value of about 70 to 140° C., about 80 to 130° C., or about 90 to 120° C., and a density of about 0.85 to 0.92 g/cm$^3$, about 0.86 to 0.90 g/cm$^3$, or about 0.86 to 0.89 g/cm$^3$. As the block copolymer of the embodiment has such a high TMA value at a relatively low density level, it can exhibit more enhanced heat resistance. In the regard, the density can be measured with a mettler density scale according to a known method. Further, the TMA value can be measured with a thermomechanical analyzer, such as, for example, TMA Q400 manufactured by TA Instruments.

For the olefin block copolymer of the embodiment, the melt index under a load of 2.16 kg at 190° C. is about 0.5 to 5 g/10 min, about 0.5 to 4.5 g/10 min, about 0.7 to 4.0 g/10 min, or about 0.7 to 3.7 g/10 min, and the Shore hardness is about 50 to 100, about 60 to 90, or about 60 to 85. As the block copolymer has such levels of melt index and Shore hardness, it exhibits good mechanical properties and high processability and thus can be used as a substitute for rubber materials in a variety of applications.

In addition, the olefin block copolymer of the embodiment may have a permanent recovery in the range of about 110% or less, about 10 to 105%, about 50 to 105%, or about 90 to 103%. In this regard, the permanent recovery can be determined from the results of a tensile test performed on a molded body of the block copolymer according to the following Mathematical Formula 3:

Permanent recovery (%)= $\{(L-L_0)/L_0\} \times 100$     [Mathematical Formula 3]

In the Mathematical Formula 3, $L_0$ denotes the initial length of the molded body of the block copolymer; and L denotes the length of the molded body recovered from at least 300% deformation, for example, 300% elongation.

The permanent recovery is defined as the degree of recovery to the original form or length from deformation imposed by an external force. When the permanent recovery after 300% elongation is about 110% or less, the block copolymer of the embodiment is considered to have good elasticity. Particularly, the block copolymer of the embodiment has excellent elasticity even at high temperature as already described above, so it can be much preferably used in a wider range of applications, including those requiring heat resistance.

The block copolymer may have a weight average molecular weight of about 50,000 to 200,000, about 60,000 to 180,000, or about 70,000 to 150,000, and a molecular weight distribution of about 2.0 or greater (e.g., about 2.0 to 4.5, about 2.0 to 4.0, about 2.0 to 3.5, or about 2.3 to 3.0). As the block copolymer has such levels of molecular weight, molecular weight distribution, and density, it can show appropriate characteristics as an olefin-based elastomer, such as, for example, good mechanical properties and high processability.

The block copolymer may be a block copolymer comprising an ethylene or propylene repeating unit (for example, an ethylene repeating unit) and an α-olefin repeating unit. In this regard, the α-olefin repeating unit may be a repeating unit derived from α-olefins, such as 1-butene, 1-pentene, 4-methyl-1-pentene, 1-hexene, 1-heptene, 1-octene, 1-decene, 1-undecene, 1-dodecene, 1-tetradecene, 1-hexadecene, or 1-itocene.

The olefin block copolymer of the embodiment may benefit from the inclusion of the α-olefin repeating unit derived from α-olefin to have good elasticity and exhibit good heat resistance due to a high degree of blocking. Therefore, the block copolymer of the embodiment can be used in a wider range of applications requiring heat resistance, overcoming the limitations of olefin-based elastomers in regards to the range of applications.

The block copolymer of the embodiment may be used substantially in all the applications in which the conventional elastomers have been adopted. Moreover, the block copolymer of the embodiment can be used in a wider range of applications to which the conventional olefin-based elastomers are substantially not applicable because of their poor heat resistance. For example, the block copolymer of the embodiment is used to form different kinds of products, including automobile parts or interior materials, such as bumpers, trimming parts, etc.; packaging materials; insulating materials; household products, such as shoe soles, toothbrush grips, flooring materials, knobs, etc.; adhesives, such as pressure-sensitive adhesives, hot melting adhesives, etc.; hoses; pipes; and so forth and adopted in a variety of other applications and uses.

The block copolymer of the embodiment may be used alone or in combination with other polymers, resins, or any kind of additives and used in any form of films, molded bodys, or fibers.

On the other hand, the olefin block copolymer of the embodiment may be prepared by using a specific catalyst system. Such a preparation method for the olefin block copolymer may comprise copolymerizing an ethylene or propylene monomer and an α-olefin monomer in the presence of a catalyst composition for olefin polymerization comprising a transition metal compound having a structure that a compound represented by the following Chemical Formula 1 as a ligand forms a coordinate covalent bond to a Group IV transition metal, and a compound represented by the following Chemical Formula 2:

[Chemical Formula 1]

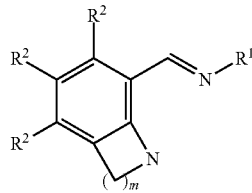

In the Chemical Formula 1, m is an integer from 1 to 7;

$R^1$ is a $C_4$-$C_{10}$ cycloalkyl group having at least one substituent selected from the group consisting of hydrogen, deuterium, halogen, nitrile, acetylene, amine, amide, ester, ketone, $C_1$-$C_{20}$ alkyl, $C_6$-$C_{20}$ cycloalkyl, $C_2$-$C_{20}$ alkenyl, $C_6$-$C_{20}$ aryl, silyl, $C_7$-$C_{20}$ alkylaryl, $C_7$-$C_{20}$ arylalkyl, and $C_4$-$C_{20}$ heterocyclic; a $C_3$-$C_9$ heterocyclic group having at least one substituent selected from the group consisting of hydrogen, deuterium, halogen, nitrile, acetylene, amine, amide, ester, ketone, $C_1$-$C_{20}$ alkyl, $C_6$-$C_{20}$ cycloalkyl, $C_2$-$C_{20}$ alkenyl, $C_6$-$C_{20}$ aryl, silyl, $C_7$-$C_{20}$ alkylaryl, $C_7$-$C_{20}$ arylalkyl, and $C_4$-$C_{20}$ heterocyclic, and containing oxygen (O), nitrogen (N), or sulfur (S) as a hetero-atom; a $C_6$-$C_{10}$ aryl group having at least one substituent selected from the group consisting of hydrogen, deuterium, halogen, nitrile, acetylene, amine, amide, ester, ketone, $C_1$-$C_{20}$ alkyl, $C_6$-$C_{20}$ cycloalkyl, $C_2$-$C_{20}$ alkenyl, $C_6$-$C_{20}$ aryl, silyl, $C_7$-$C_{20}$ alkylaryl, $C_7$-$C_{20}$ arylalkyl, and $C_4$-$C_{20}$ heterocyclic; or a $C_5$-$C_{10}$ hetero-aryl group having at least one substituent selected from the group consisting of hydrogen, deuterium, halogen, nitrile, acetylene, amine, amide, ester, ketone, $C_1$-$C_{20}$ alkyl, $C_6$-$C_{20}$ cycloalkyl, $C_2$-$C_{20}$ alkenyl, $C_6$-$C_{20}$ aryl, silyl, $C_7$-$C_{20}$ alkylaryl, $C_7$-$C_{20}$ arylalkyl, and $C_4$-$C_{20}$ heterocyclic, and containing oxygen (O), nitrogen (N), or sulfur (S) as a hetero-atom, where when $R^1$ has at least two substituents, the adjacent two groups forms an aliphatic or aromatic condensed ring; and $R^2$s are the same or different from one another and independently selected from hydrogen, deuterium, halogen, nitrile, acetylene, amine, amide, ester, ketone, $C_1$-$C_{20}$ alkyl, $C_2$-$C_{20}$ alkenyl, $C_6$-$C_{20}$ aryl, $C_4$-$C_{20}$ heterocyclic, $C_1$-$C_{20}$ alkoxy, and $C_6$-$C_{20}$ aryloxy, where at least two $R^2$ are linked to each other to form an aliphatic or aromatic ring.

[Chemical Formula 2]

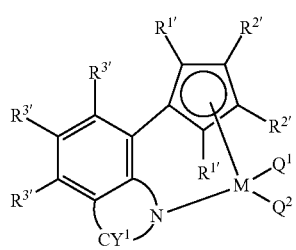

In the Chemical Formula 2, $R^{1'}$ is $R^{2'}$ are independently hydrogen, $C_1$-$C_{20}$ alkyl, $C_6$-$C_{20}$ aryl, silyl, $C_2$-$C_{20}$ alkenyl, $C_7$-$C_{20}$ alkylaryl, $C_7$-$C_{20}$ arylalkyl, or Group 14 metalloid radical having a hydrocarbyl substituent, where $R^{1'}$ and $R^{2'}$ are linked to each other via an alkylidyne radical containing a $C_1$-$C_{20}$ alkyl group or an aryl group to form a ring;

$R^{3'}$s are independently hydrogen, halogen, $C_1$-$C_{20}$ alkyl, $C_6$-$C_{20}$ aryl, $C_r$-$C_{20}$ alkoxy, $C_6$-$C_{20}$ aryloxy, or amido, where at least two $R^{3'}$s are linked to each other to form an aliphatic or aromatic ring;

$CY^1$ is a substituted or unsubstituted aliphatic or aromatic ring;

M is a Group IV transition metal; and $Q^1$ and $Q^2$ are independently halogen, $C_1$-$C_{20}$ alkyl, $C_6$-$C_{20}$ arylamido, $C_2$-$C_{20}$ alkenyl, $C_6$-$C_{20}$ aryl, $C_7$-$C_{20}$ alkylaryl, $C_7$-$C_{20}$ arylalkyl, or $C_1$-$C_{20}$ alkylidene.

Among the substituents of the Chemical Formulas 1 and 2 in the preparation method, the alkyl group includes a linear or branched alkyl group; the alkenyl group includes a linear or branched alkenyl; the silyl group includes trimethylsilyl, triethylsilyl, tripropylsilyl, tributylsilyl, trihexylsilyl, triisopropylsilyl, triisobutylsilyl, triethoxysilyl, triphenylsilyl, tris(trimethylsilyl)silyl, or the like; the aryl group includes a heteroaryl group as well as a $C_6$-$C_{20}$ aryl group. Specific examples of the aryl group may include phenyl, naphthyl, anthracenyl, pyridyl, dimethylanilinyl, anisoryl, etc. The alkylaryl group refers to an aryl group having the alkyl group as a substituent.

Among the substituents of the Chemical Formulas 1 and 2, the arylalkyl group is an alkyl group having the aryl group as a substituent; the halogen group is a fluorine group, a chlorine group, a bromine group, or an iodine group; the alkylamino group is an amino group having the alkyl group as a substituent, where the specific examples of the amino group include a dimethylamino group, diethylamino group, etc.; and the arylamino group is an amino group having the aryl group as a substituent, where the specific examples of the arylamino group include a diphenylamino group, etc. However, the specific examples of each group are not limited to those mentioned above.

In the preparation method for the block copolymer, the transition metal compound derived from a compound of the Chemical Formula 1 as a ligand contained in the catalyst composition prefers involving polymerization and coupling of the ethylene or propylene monomer to form a hard segment, while the compound of the Chemical Formula 2 primarily involves polymerization and coupling of the α-olefin monomer to form a soft segment. Therefore, the use of the catalyst composition leads to interactions of those two catalysts in alternately forming the hard segment having a lower content of the α-olefin repeating unit and the soft segment having a higher content of the α-olefin repeating unit, thereby providing an olefin bock copolymer with a higher degree of blocking than the conventional copolymers. Such an olefin block copolymer particularly satisfies the above-described relationship between the molecular weight distribution and the number of short-chain branches of the polymer chain, consequently with excellences in elasticity and heat resistance and enhanced processability relative to the conventional block copolymers. Thus, the block copolymer can be properly used as an olefin-based elastomer in a wider range of applications.

Furthermore, the use of the catalyst composition provides a block copolymer with excellent heat resistance at high productivity through a relatively simple process of preparation, greatly contributing to the commercialization of olefin-based elastomers with good heat resistance.

On the other hand, the compound of the Chemical Formula 1 can be a compound represented by the following Chemical Formula 1-1 or 1-2:

[Chemical Formula 1-1]

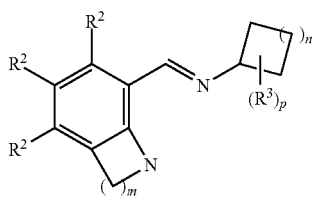

[Chemical Formula 1-2]

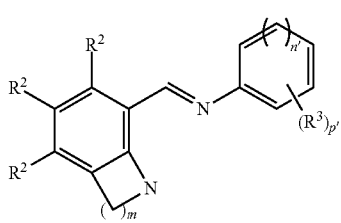

In the Chemical Formula 1-1 or 1-2, m and $R^2$ are as defined in the Chemical Formula 1; n is an integer from 1 to 7; n' is an integer from 1 to 5; p is an integer from 0 to 2+n; p' is an integer from 0 to 5+n'; and $R^3$s are the same or different from one another and independently selected from deuterium, halogen, nitrile, acetylene, amine, amide, ester, ketone, $C_1$-$C_{20}$ alkyl, $C_6$-$C_{20}$ cycloalkyl, $C_2$-$C_{20}$ alkenyl, $C_6$-$C_{20}$ aryl, silyl, $C_7$-$C_{20}$ alkylaryl, $C_7$-$C_{20}$ arylalkyl, or $C_4$-$C_{20}$ heterocyclic, where at least two $R^3$s are linked to each other to form an aliphatic or aromatic ring. For a more specific example, $R^3$ is $C_1$-$C_{20}$ alkyl, $C_6$-$C_{20}$ cycloalkyl, $C_2$-$C_{20}$ alkenyl, or $C_6$-$C_{20}$ aryl, where at least two $R^a$s are linked to each other to form an aliphatic or aromatic ring.

In the Chemical Formula 1-1 or 1-2, for another specific example, m is 2 or 3; n is 2 or 3; and n" is from 1 to 3.

Specific examples of the compound of the Chemical Formula 1 may include at least one selected from the group consisting of the compounds represented by the following Chemical Formula 1-3:

[Chemical Formula 1-3]

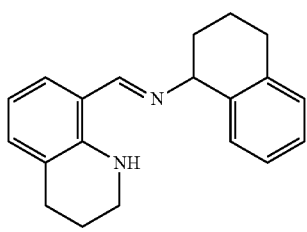

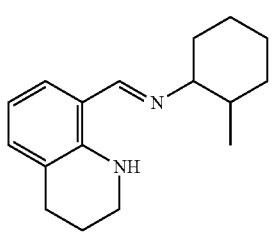

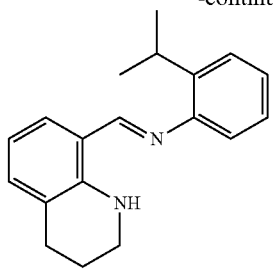

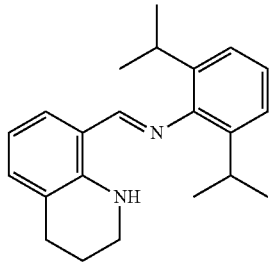

The general preparation method for the compound of the Chemical Formula 1 is given as follows:

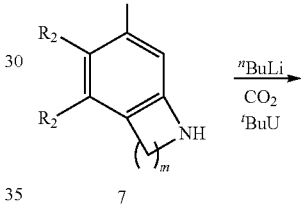

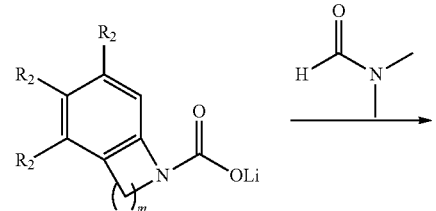

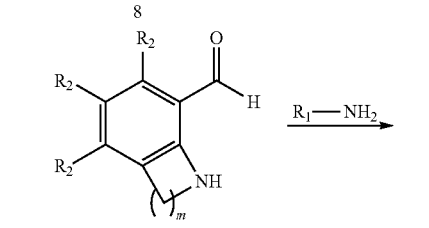

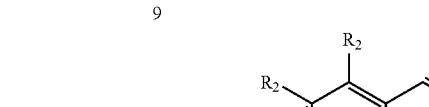

In the preparation method for the compound of the Chemical Formula 1, $R^1$ and $R^2$ are as defined in the Chemical Formula 1. In the preparation method, compound 7 can be used as a starting material to synthesize intermediate 8 by selective lithium substitution, and then DMF (N,N-dimethyl formamide) is added to obtain compound 9. Subsequently, the compound 9 is reacted with $R^1$—$NH_2$ through reflux or agitation to yield a compound of the Chemical Formula 1. Particularly, when $R^1$ in $R^1$—$NH_2$ is aryl, reflux is carried out overnight after an addition of 4A MS to yield the final product; or when $R^1$ is alkyl or alkylaryl, agitation is carried out overnight at the room temperature.

Depending on the type of $R^1$, the compound of the Chemical Formula 1 can be a ligand compound (e.g., NN chelate) having two chelating points with a metal or a ligand compound (e.g., NNN, NNO, or NNC chelate) having at least three chelating points with a metal.

The preparation method for the olefin block copolymer uses, as a catalyst, a transition metal compound having the compound of the Chemical Formula 1 as a ligand forming a coordination bond to a Group IV transition metal, the specific examples of which may include Ti, Zr, or Hf.

The transition metal compound can be represented by, if not specifically limited to, any one of the following structural formulas:

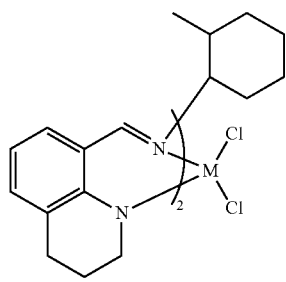

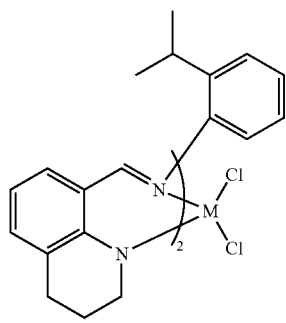

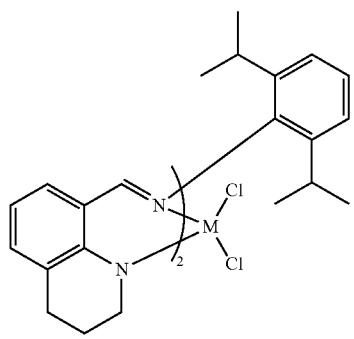

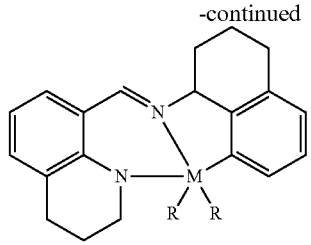

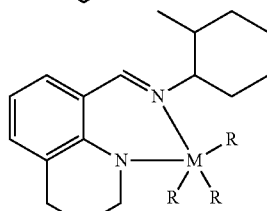

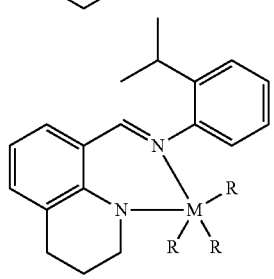

In the structural formulas, M is a Group IV transition metal; and Rs are the same or different from one another and independently selected from the group consisting of hydrogen, deuterium, halogen, nitrile, acetylene, amine, amide, ester, ketone, $C_1$-$C_{20}$ alkyl, $C_2$-$C_{20}$ alkenyl, $C_6$-$C_{20}$ aryl, $C_4$-$C_{20}$ heterocyclic, $C_1$-$C_{20}$ alkoxy, and $C_6$-$C_{20}$ aryloxy.

As can be seen from the structural formulas, the transition metal compound may have a structure that the mole ratio of the ligand to the transition metal is 2:1 or 1:1. Such a structural characteristic contributes to a relatively high content of the transition metal in the transition metal compound.

According to one example of the present invention, the transition metal compound may be prepared by the method given as follows. Firstly, a defined amount of a ligand represented by the Chemical Formula 1 and 1.05 equivalent of a metal precursor are mixed together, and an appropriate amount of a toluene solvent is added to the mixture at about −75 to −80° C. The resultant mixture is then slowly heated up to the room temperature and stirred for 6 to 24 hours. Subsequently, the solvent is removed to yield a desired transition metal compound; or if the added amount of the solvent is known, the desired transition metal compound is obtained in the solution phase.

The preparation method for the olefin block copolymer may use a compound of the Chemical Formula 2 as a catalyst, in addition to the transition metal compound derived from the Chemical Formula 1. Such a compound of the Chemical Formula 2 can be obtained by a known method as disclosed in, for example, Korean Patent Publication No. 0820542.

The compound of the Chemical Formula 2 can be a compound represented by the following Chemical Formula 2-1 in consideration of the electronic and stereoscopic environments around the metal in the Chemical Formula 1:

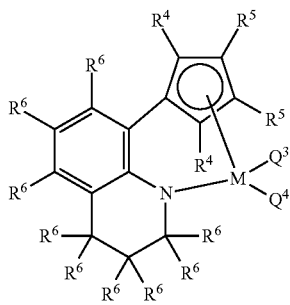

[Chemical Formula 2-1]

In the Chemical Formula 2-1, $R^4$ and $R^5$ are independently hydrogen, $C_1$-$C_{20}$ alkyl, $C_6$-$C_{20}$ aryl, or silyl; each $R^6$s are independently $C_1$-$C_{20}$ alkyl, $C_6$-$C_{20}$ aryl, $C_2$-$C_{20}$ alkenyl, $C_7$-$C_{20}$ alkylaryl, $C_7$-$C_{20}$ arylalkyl, $C_1$-$C_{20}$ alkoxy, $C_6$-$C_{20}$ aryloxy, or amido, where at least two $R^6$s are linked to each other to form an aliphatic or aromatic ring; $Q^3$ and $Q^4$ are independently halogen, $C_1$-$C_{20}$ alkyl, $C_6$-$C_{20}$ arylamido, $C_2$-$C_{20}$ alkenyl, or $C_6$-$C_{20}$ aryl, and M is a Group IV transition metal.

The compound of the Chemical Formula 2 or 2-1 has the amido group linked to the amino or alkoxy group via a phenylene bridge to form a narrow angle of Cp-M-E and a wide angle of $Q^1$-M-$Q^2$ or $Q^3$-M-$Q^4$ to which monomers are accessible. This allows bulky monomers to gain easy access to the compound. Such a structural characteristic makes the compound of the Chemical Formula 2 or 2-1 prefer involving polymerization and coupling of α-olefin rather than ethylene or propylene and contribute to formation of a soft segment. Contrarily, the transition metal compound derived from the ligand of the Chemical Formula 1 contributes to formation of a hard segment.

Unlike the silicone-bridged CGC structure, the compound of the Chemical Formula 2 or 2-1 may form a stable and rigid six-membered ring structure having a metal linked to a nitrogen via, for example, a phenylene bridge. Such a compound is activated through reaction with a cocatalyst such as methyl aluminoxane or $B(C_6F_5)_3$ and then applied to a polymerization of olefin, thereby producing an olefin block copolymer characterized by high activity, high molecular weight, and high copolymerizability even at high polymerization temperature.

The catalyst composition may further comprise at least one cocatalyst compound selected from the group consisting of the compounds represented by the following Chemical Formula 3, 4 or 5, in addition to the two cocatalysts (transition metal compounds):

$$J(R^{4'})_3 \quad \text{[Chemical Formula 3]}$$

In the Chemical Formula 3, J is aluminum (Al) or boron (B); and $R^{4'}$s are independently a halogen or a halogen-substituted or unsubstituted $C_1$-$C_{20}$ hydrocarbyl radical.

$$[L\text{-}H]^+[ZA_4]^- \text{ or } [L]^+[ZA_4]^- \quad \text{[Chemical Formula 4]}$$

In the Chemical Formula 4, L is a neutral or cationic Lewis acid; H is hydrogen; Z is a Group 13 element, and As are independently $C_6$-$C_{20}$ aryl or $C_1$-$C_{20}$ alkyl in which at least one hydrogen is substituted by a halogen, a $C_1$-$C_{20}$ hydrocarbyl group, a $C_1$-$C_{20}$ alkoxy group, or a phenoxy group.

$$-[Al(R^{5'})-O]_a- \quad \text{[Chemical Formula 5]}$$

In the Chemical Formula 5, $R^{5'}$ is a halogen or a halogen-substituted or unsubstituted $C_1$-$C_{20}$ hydrocarbyl radical; and a is an integer of 2 or greater.

In this regard, the compound of the Chemical Formula 3 may be an alkyl metal compound without any limitation, the specific examples of which may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, trimethylboron, triethylboron, triisobutylboron, tripropylboron, tributylboron, and so forth.

The specific examples of the compound of the Chemical Formula 4 may include triethylammonium tetra(phenyl)boron, tributylammonium tetra(phenyl) boron, trimethylammonium tetra(phenyl)boron, tripropylammonium tetra(phenyl) boron, trimethylammonium tetra(p-tolyl) boron, trimethylammonium tetra(o,p-dimethylphenyl)boron, tributylammonium tetra(p-trifluoromethylphenyl)boron, trimethylammonium tetra(p-trifluoromethylphenyl) boron, tributylammonium tetra(pentafluorophenyl)boron, N,N-diethylanilinium tetra(phenyl)boron, N,N-diethylanilinium tetra(pentafluorophenyl)boron, diethylammonium tetra(pentafluorophenyl)boron, trimethylphosphonium tetra(phenyl) boron, triethylammonium tetra(phenyl)aluminum, tributylammonium tetra(phenyl)aluminum, trimethylammonium tetra(phenyl) aluminum, tripropylammonium tetra(phenyl)aluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl)aluminum, tributylammonium tetra(pentafluorophenyl) aluminum, N,N-diethylanilinium tetra(pentafluorophenyl)aluminum, diethylammonium tetra(pentafluorophenyl)aluminum, triphenylphosphonium tetra(phenyl)aluminum, trimethylphosphonium tetra(phenyl)aluminum, tripropylammonium tetra(p-tolyl)boron, triethylammonium tetra(o,p-dimethylphenyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetra (pentafluorophenyl) boron, N,N-diethylanilinium tetra (phenyl)boron, triphenylphosphonium tetra(phenyl)boron, triphenylcarbonium tetra(p-trifluoromethylphenyl)boron, triphenylcarbonium tetra(pentafluorophenyl)boron, trityl tetra(pentafluorophenyl)boron, dimethylanilinium tetrakis (pentafluorophenyl) borate, trityltetrakis(pentafluorophenyl) borate, and so forth.

The compound of the Chemical Formula 5 may be an alkylaluminoxane without any limitation, the specific examples of which may include methylaluminoxane, ethylaluminoxane, isobutylaluminoxane, butylaluminoxane, and so forth.

The added amount of the cocatalyst compound may be given so that the mole ratio of the cocatalyst with respect to the transition metal compound derived from the Chemical Formula 1 or the compound represented by the Chemical Formula 2 (hereinafter, referred to as "main catalyst compound") is about 1:1 to 1:20, such as, for example, about 1:1 to 1:18, or about 1:1 to 1:15. To acquire the effect of the cocatalyst compound to a defined level or above, the cocatalyst may be added so that the mole ratio of the cocatalyst compound with respect to the main catalyst compound is 1:1 or greater. Further, the cocatalyst compound may be used so that the mole ratio of the cocatalyst compound with respect to the main catalyst compound is 1:20 or less, in order to properly control the properties of the block copolymer product and effectively activate the main catalyst compound.

The catalyst compound may further comprise a polymerization aid. The polymerization aid may be at least one compound selected from the group consisting of an aluminum compound containing a $C_1$-$C_{12}$ hydrocarbyl substituent, a zinc compound containing a $C_1$-$C_{12}$ hydrocarbyl substituent, and a gallium compound containing a $C_1$-$C_{12}$ hydrocarbyl substituent. Specific examples of the polymerization aid may include triethylaluminum or diethylzinc.

The polymerization aid plays a role to enhance the degree of blocking and the crystallinity of the molecular structure and increase the content of the α-olefin repeating unit to produce a block copolymer with low density and high melting temperature. This is because the polymerization aid enables alternating actions of the transition metal compound derived from the Chemical Formula 1 and the compound of the Chemical Formula 2 and helps alternately forming a plurality of segments constituting the olefin block copolymer, that is, for example, hard and soft segments. In other words, such an action of the polymerization aid makes it possible to produce an olefin block copolymer with a higher degree of blocking and hence higher melting temperature and higher heat resistance.

The added amount of the polymerization aid may be given to have the mole ratio of the polymerization aid with respect to the main catalyst compound in the range of about 1:10 to 1:1,000, such as, for example, about 1:10 to 1:500, or about 1:20 to 1:200.

In other words, the content of the polymerization aid may be given to have the mole ratio of the polymerization aid with respect to the main catalyst compound in the range of 1:10 or greater in view of providing the effect of the polymerization aid to a defined level or above; and 1:1,000 or less in consideration of properly controlling the properties of the block copolymer product and providing high activity of the main catalyst compound.

According to the above-described preparation method, the olefin block copolymer can be prepared by a method that includes the step of copolymerizing monomers comprising ethylene or propylene and α-olefin in the presence of the aforementioned catalyst composition. In this regard, specific examples of the α-olefin monomer may include 1-butene, 1-pentene, 4-methyl-1-pentene, 1-hexene, 1-heptene, 1-octene, 1-decene, 1-undecene, 1-dodecene, 1-tetradecene, 1-hexadecene, and 1-itocene.

The copolymerization step may be carried out at a temperature of about 140° C. or higher, about 140 to 180° C., or about 140 to 160° C., and under the pressure of about 50 bar or higher, about 50 to 120 bar, or about 70 to 100 bar. The conventional metallocene or post-metallocene catalysts are known to have an abrupt drop in their activity at high temperature. Contrarily, the main catalyst compounds contained in the aforementioned catalyst composition can maintain good activity even under conditions including a temperature of about 14° C. or higher and a pressure of about 50 bar or higher. Accordingly, the copolymerization process can be carried out under such high-temperature and high-pressure conditions to acquire a block copolymer with high molecular weight and good properties with more efficiency.

The copolymerization step may be carried out as a solution phase process using the aforementioned catalyst composition, or as a slurry or gas phase process using the catalyst composition in combination with an inorganic support such as silica. Hereinafter, a description will be given as to the more specific conditions and method for the process of the copolymerization step focusing on the continuous solution polymerization method.

In the copolymerization step, a scavenger may be added into the reactor as much as 0.4 to 5 times the total content of water. Such a scavenger which serves to eliminate impurities such as water or air potentially contained in the reactants can be added prior to the copolymerization of the reactants. The mixture of the scavenger and the reactants are added into a separate reactor other than the polymerization reactor, or into a reactant-feeding line of the polymerization reactor for a sufficient period of time. Preferred examples of the scavenger may include, but are not specifically limited to, trialkylaluminum, such as TiBAl (triisobutylaluminum) or TOA (trioctylaluminum).

The polymerization step may be carried out by adding the aforementioned catalyst composition, monomers, the polymerization aid, and the scavenger into the reactor.

In this regard, the catalyst composition may be dissolved or diluted with a solvent suitable for olefin polymerization, including aliphatic hydrocarbon solvents having 5 to 12 carbon atoms (e.g., pentane, hexane, heptane, nonane, decane, or their isomers); aromatic hydrocarbon solvents (e.g., toluene or benzene); or chlorine-substituted hydrocarbon solvents (e.g., dichloromethane or chlorobenzene).

In one example performing the copolymerization step, the mole ratio of ethylene or propylene to the solvent needs to be suitable for dissolving the block copolymer product. For example, the mole ratio of ethylene or propylene to the solvent can be about 1/0,000 to 10, about 1/100 to 5, or about 1/20 to 1. Such a proper control of the mole ratio makes it possible to effectively perform the copolymerization step and optimize the amount of the solvent, thus preventing a rise of the facility or energy expenses for purification and recycling of the solvent.

The solvent may be added into a reactor at about −40 to 150° C. using a heater or a freezer to initiate the polymerization reaction together with the monomers and the catalyst composition.

Further, a high-capacity pump is used to raise the pressure up to about 50 bar in supplying reactants (e.g., the solvent, the monomers, and the catalyst composition), so the mixture of the reactants can be passed without additional pumping between the reactor arrangement and pressure-reducing apparatus and the separator.

The concentration of the block copolymer produced in the reactor can be maintained to a concentration level of less than about 20 wt. % in the solvent. After an elapse of a short retention time, the block copolymer product can be transferred to a first solvent separation process in order to remove the solvent. The appropriate retention time of the block copolymer in the reactor may be about 1 minute to 10 hours, about 3 minutes to one hour, or about 5 to 30 minutes. Such a retention time prevents a drop of productivity or a loss of the catalyst and optimizes the size of the reactor.

Subsequent to the aforementioned copolymerization step, the solvent separation process is further carried out by changing the temperature and pressure of the block copolymer solution in order to remove the solvent remaining with the block copolymer released from the reactor. In this regard, a heater is used to maintain the melting state of the block copolymer solution transferred from the reactor. The unreacted solvent is evaporated in the separator, and the block copolymer product is granulated through an extruder.

As described above, the present invention provides an olefin block copolymer with excellent heat resistance and elasticity and enhanced processability. Particularly, such an olefin block copolymer can be prepared by a simple process.

Accordingly, the olefin block copolymer contributes to commercialization of olefin-based elastomers excellent in heat resistance and other general properties and can be properly adopted in a variety of applications where it is available as a substitute for rubber materials.

EXAMPLES

Hereinafter, some examples will be given for better understanding of the present invention, but the following examples are presented only for a mere illustration though, and the scope of the present invention should not be construed to be defined thereby.

In the following examples, organic reagents and solvents as used herein are purchased from Aldrich Chemical Company Inc. and Merck Chemicals Co., Ltd. and purified according to the standard methods. In all the steps of synthesis, a contact with air and water was avoided to enhance the reproducibility of the experiments. To identify the structure of a chemical, 400 MHz nuclear magnetic resonance (NMR) and X-ray spectroscopic instruments were used to obtain the respective spectra and diagrams.

The term "overnight" as used herein refers to approximately 12 to 16 hours, and the term "room temperature" as used herein refers to the temperature of 20 to 25° C. The synthesis of all the transition metal compounds and the preparation of experiments were carried out using the dry box technique or glass tools maintained in dry condition under the dry nitrogen atmosphere. All the solvents used in the examples were of the HPLC level and dried before use.

Preparation Example 1

Preparation of (E)-N-((1,2,3,4-tetrahydroquinolin-8-yl) methylene)-2-methylcyclohexanamine 1.06 g of tetrahydroquinolino aldehyde was dissolved in 17 mL of methanol, and 1.3 mL of 2-methylcyclohexyl amine was slowly added. After agitated overnight at the room temperature, the resultant solution was removed of the solvent under reduced pressure and then dissolved in hexane again to prepare a thick solution, which was stored in a freezer. This solution contained two stereoscopic isomer products at a ratio of about 1.5:1. After about 2 days, a white crystalline solid appeared in the solution. The same procedures were performed on the remaining store solution to collect a solid, which was washed with cold methanol and hexane and dried to yield pure stereoscopic isomer products (yield: 50%).

1H NMR (500 MHz, d-toluene): 0.83 (d, J=7 Hz, 3H, $CH_3$), 0.95-1.01 (m, 1H, CH), 1.20-1.29 (m, 2H, $CH_2$), 1.52-1.71 (m, 8H, $CH_2$), 2.09-2.10 (m, d-tol), 2.38-2.43 (m, 1H, CH), 2.51-2.53 (m, 2H, $CH_2$), 3.12-3.13 (m, 2H, $CH_2$), 6.55 (t, J=7.5 Hz, 1H, phenyl), 6.83 (d, J=7.5 Hz, 1H, phenyl), 6.97-7.01 (m, 1H, phenyl, d-tol), 7.10 (s, d-tol), 8.16 (s, 1H, CH), 9.27 (b, 1H, NH).

Preparation Example 2

Preparation of Zirconium Catalyst I 145 mg of the ligand compound prepared in the Preparation Example 1 and 231 mg of zirconium benzyl were subjected to sampling in a globe box and then put into a Schlenk flask. The Schlenk flask was taken out and cooled down to −78° C. With the temperature maintained, 12 mL of toluene was slowly added to the resultant solution, which was then gradually heated up to the room temperature and agitated for 6 hours to obtain a thick orange-colored toluene solution. The solution was removed of the solvent to yield a pure product.

1H NMR (500 MHz, d-toluene): 1.09-1.13 (m, 1H, $CH_3$), 1.50-1.61 (m, 1H, $CH_2$), 1.65-1.75 (m, 4H, $CH_2$), 2.31 (d, J=10.5 Hz, 1H, $CH_2Ph$), 2.49-2.61 (m, 6H, $CH_2$ and $CH_2Ph$), 2.67 (d, J=10.5 Hz, 1H, $CH_2Ph$), 3.18-3.24 (m, 1H, $CH_2$), 3.56-3.62 (m, 1H, $CH_2$), 4.30-4.34 (m, 1H, CH), 6.55-7.23 (m, 15H, phenyl), 7.97 (s, 1H, 이민 CH), 8.13 (d, J=7 Hz, 1H, phenyl).

Preparation Example 3

Preparation of Zirconium Catalyst II 90 mg of the ligand compound prepared in the Preparation Example 1 and 169 mg of zirconium benzyl were subjected to sampling in a globe box and then put into a Schlenk flask. The Schlenk flask was taken out and cooled down to −78° C. With the temperature maintained, 10 mL of toluene was slowly added to the resultant solution, which was then gradually heated up to the room temperature and agitated for 2 days to obtain a thick orange-colored toluene solution as a product solution.

1H NMR (500 MHz, d-toluene): 0.41 (d, J=7 Hz, 3H, $CH_3$), 0.83-1.03 (m, 4H, $CH_2$), 1.18-1.31 (m, 2H, $CH_2$), 1.40-1.62 (m, 5H, $CH_2$), 1.83-1.88 (m, 1H, CH), 2.05-2.12 (m, d-tol, $CH_2$), 2.47-2.55 (m, 8H, $CH_2$), 3.21-3.25 (m, 1H, CH), 3.38-3.41 (m, 1H, CH), 3.79-3.83 (m, 1H, CH), 6.58 (t, J=7.5 Hz, 1H, phenyl), 6.82-7.12 (m, phenyl, d-tol), 8.07 (s, 1H, CH).

Comparative Examples 1 and 2 and Examples 1 to 10

Preparation of ethylene/1-octene block copolymer

Under the pressure of 89 bar, 1-octene and ethylene as monomers and a hexane solvent (3.20 kg/h) were fed into a 1.5 L continuous stirred tank reactor preheated up to 100 to 150° C. Into the reactor were fed defined catalysts as given in the following Table 1 and a dimethylanilinium tetrakis(pentafluorophenyl)borate cocatalyst from a catalyst storage tank and then added a scavenger (TIBAL) and diethyl zinc to activate a copolymerization reaction. The scavenger was first mixed with reactants in order to eliminate impurities potentially contained in the reactants and then fed into the reactor. In the Examples, the polymerization reaction was carried out at a relatively high temperature of 140 to 150° C., and the polymer solution resulting from the copolymerization reaction was transferred into a solvent separator to remove most of the solvent. The resultant solution was passed through a cooling water and a cutter to yield a granulated polymer product. The polymerization conditions for ethylene and 1-octene according to the Comparative Examples 1 and 2 and Examples 1 to 10 are presented in the following Table 1.

[Catalyst A]

The catalyst A compound as used in the following Examples and Comparative Examples was (E)-N-((1,2,3,4-tetrahydroquinolin-8-yl)methylene)-2-methylcyclohexanamine zirconium benzyl as prepared in the Preparation Example 2.

[Catalyst B]

The catalyst B compound as used in the following Examples and Comparative Examples was 1,2,3,4-tetrahydro-8-(2,3,4-trimethyl-5-methylenecyclopenta-1,3-dienyl)quinolone dimethyl titanium as prepared in the example of Korean Patent Publication No. 0820542.

TABLE 1

|  | Comparative Example 1 | Comparative Example 2 |
|---|---|---|
| Polymerization temperature (° C.) | 135 | 168 |
| Catalyst A (μmol/hr) | 18 | — |
| Catalyst B (μmol/hr) | — | 18 |
| Ethylene (kg/hr) | 0.63 | 0.63 |
| 1-octene (kg/hr) | 0.60 | 0.60 |
| Cocatalyst (μmol/hr) | 90 | 90 |
| Scavenger (ml/hr) (10 mM) | 3.5 | 3.5 |
| Diethyl zinc (ml/hr) (10 mM) | — | — |
| Hydrogen (L/hr) | — | — |

| | Example | | | | | | | | | |
|---|---|---|---|---|---|---|---|---|---|---|
| | 1 | 2 | 3 | 4 | 5 | 6 | 7 | 8 | 9 | 10 |
| Polymerization temperature (° C.) | 145 | 141 | 143 | 143 | 140 | 142 | 149 | 144 | 145 | 142 |
| Catalyst A (μmol/hr) | 18 | 18 | 18 | 18 | 18 | 18 | 18 | 18 | 18 | 18 |
| Catalyst B (μmol/hr) | 6 | 6 | 6 | 6 | 6 | 6 | 6 | 6 | 6 | 6 |
| Ethylene (kg/hr) | 0.63 | 0.63 | 0.63 | 0.63 | 0.73 | 0.58 | 0.68 | 0.68 | 0.63 | 0.63 |
| 1-octene (kg/hr) | 0.60 | 0.75 | 0.67 | 0.90 | 0.75 | 0.60 | 0.60 | 0.90 | 0.75 | 0.60 |
| Cocatalyst (μmol/hr) | 120 | 120 | 120 | 120 | 120 | 120 | 120 | 120 | 120 | 120 |
| Scavenger (ml/hr) (10 mM) | 3.5 | 3.5 | 3.5 | 3.5 | 3.5 | 3.5 | 3.5 | 3.5 | 3.5 | 3.5 |
| Diethyl zinc (ml/hr) (10 mM) | 3.5 | 3.5 | 3.5 | 3.5 | 3.5 | 3.5 | 3.5 | 3.5 | 3.5 | 3.5 |
| Hydrogen (L/hr) | — | — | — | — | — | — | — | — | 1.0 | 1.5 |

Experimental Example 1

The copolymers prepared in the Examples 1 to 10 and Comparative Examples 1 and 2 were evaluated in regards to properties according to the methods as described below. The evaluation results are presented in Tables 2 and 3.

1) Analysis on the Molecular Weight Distribution and the Number of SCBs of Polymer Chains Each copolymer was analyzed by gel permeation chromatography (GPC) to elicit a curve showing the molecular weight distribution of polymer chains constituting a copolymer. Each copolymer was also subjected to FT-IR analysis to obtain a distribution curve showing the number of short-chain branches (SCBs) per 1,000 carbon atoms (X-axis) as a function of the molecular weight (Y-axis) of the polymer chains. The results are depicted in FIG. 1, The analytical results from the other copolymers were obtained in the same manner.

Based on the results of the FT-IR analysis, each copolymer was determined in regards to (1) the maximum number of SCBs per 1,000 carbon atoms and the median of the molecular weight of the polymer chains; (2) the range of a first derivative (dY/dX) in the region corresponding to the median of the molecular weight or above; and (3) the range of the number of SCBs per 1,000 carbon atoms in the region corresponding to the median of the molecular weight or above. The results are presented in Table 2. In addition, the range of the first derivative (dY/dX) in the region where the molecular weight was in the bottom less than 40% was calculated.

2) MI (Melt Index)

The copolymers of the Examples and Comparative Examples were measured in regards to melt index (MI) according to the ASTM D-1238 (conditions E, 190° C., load of 2.16 kg).

3) Density

Each copolymer of the Examples and Comparative Examples was molded into a sample in the form of a sheet (3 mm thick and 2 cm in radius) using a press mold (180° C.) and measured in regards to the density with a Mettler scale at a rate of 10° C./min.

4) Melting Temperature (Tm)

The copolymer sample was heated up to 200° C., maintained at the temperature for 5 minutes, cooled down to 30° C., and then heated up again. In the measurement results from DSC (Differential Scanning calorimeter, manufacture by TA instruments), the top of the heat flow curve was determined as the melting temperature. In this regard, the heating/cooling rate was 10° C./min, and the measurement results obtained in the second heating interval were used to determine the melting temperature.

5) PDI (PolyDispersity Index): Weight Average Molecular Weight and Molecular Weight Distribution GPC (Gel Permeation Chromatography) was adopted to measure the number average molecular weight (Mn) and the weight average molecular weight (Mw), and the weight average molecular weight was divided by the number average molecular weight to calculate the molecular weight distribution.

6) TMA (Thermal Mechanical Analysis)

A sample penetration testing (under the force of 0.5 N) was carried out using TMA Q400 manufactured by TA Instruments, where the temperature was raised from 25° C. at a rate of 5° C./min. The distance of the TMA probe from the sample was measured as a function of temperature, and the temperature when the probe was 1 mm distant from the sample was considered as the test value.

7) Permanent Recovery

A universal testing machine manufactured by Zwick was employed to measure the permanent recovery after 300% elongation for the sample according to the ASTM D638.

TABLE 2

|  | Max. number of SCBs | dY/dX range in the region corresponding to median or above | Range of number of SCBs in the region corresponding to median or above |
|---|---|---|---|
| Comparative Example 1 | Less than measurement limit | — | — |
| Comparative Example 2 | 64 | $-9.53 \times 10^{-5}$ to 0.023 | 30~64 |
| Example 1 | 48 | $-5.61 \times 10^{-5}$ to $6.54 \times 10^{-5}$ | 41~48 |
| Example 2 | 55 |  | 38~55 |
| Example 3 | 52 |  | 35~52 |
| Example 4 | 61 |  | 44~61 |
| Example 5 | 42 |  | 25~42 |
| Example 6 | 43 |  | 26~43 |
| Example 7 | 42 |  | 25~42 |
| Example 8 | 57 |  | 40~57 |
| Example 9 | 55 |  | 38~55 |
| Example 10 | 46 |  | 29~46 |

* For the copolymer of Comparative Example 1, the number of SCBs was less than the measurement limit, so the dY/dX value and the range of the number of SCBs were immeasurable.

Referring to Table 2, for the block copolymers of the Examples 1 to 10, the first derivative was about $-5.61 \times 10^{-5}$ to $6.54 \times 10^{-5}$, within the range of $-1.0 \times 10^{-4}$ to $1.0 \times 10^{4}$, in the region where the polymer chains had a molecular weight corresponding to the median or above. This implies that the block copolymer had almost no change in the number of short-chain branches (SCBs) irrespective of a change in the molecular weight and contained SCBs of a constant level, showing a higher degree of blocking, in the region where the polymer chains had a relative high molecular weight.

Contrarily, the first derivative had a considerably high value of about $2.0 \times 10^{-4}$ to 0.1 in the region where the molecular weight of the polymer chains was low, particularly in the bottom less than 40%. This shows that the polymer chains with low molecular weight had the number of SCBs in proportion to the molecular weight, which characteristic was similar to that of random copolymers.

In contrast, the copolymer of the Comparative Example 1 had almost no short-chain branch and thus proved to be a copolymer containing almost none of the α-olefin repeating units and definitely distinct in the form and characteristics from the block copolymers of the Examples.

For the copolymer of the Comparative Example 2, the first derivative had a considerably wide range of value, particularly up to 0.02 at maximum, which was far greater than those of the copolymers from Examples, in the region where the polymer chains had a molecular weight corresponding to the median or above. This shows that the copolymer of the Comparative Example 2 had a very great change in the number of SCBs pertaining to the change of the molecular weight, thus exhibiting a considerably low degree of blocking even in the region where the polymer chains had a relatively high molecular weight, so it could have neither the SCB distribution characteristic of the Examples nor the form of a block copolymer substantially.

TABLE 3

|  | Density (g/cm³) | MI (g/10 min) | Melting Temp. (° C.) | Molecular Weight (Mw) | Molecular Weight Distribution (PDI) | TMA (° C.) | Permanent recovery (%) |
|---|---|---|---|---|---|---|---|
| Comparative Example 1 | 0.928 | 0.6 | 128 | 140,500 | 2.4 | — | — |
| Comparative Example 2 | 0.870 | 3.6 | 58 | 89,000 | 2.5 | 60 | 55 |
| Example 1 | 0.877 | 0.5 | 122 | 122,800 | 2.5 | 114 | 99 |
| Example 2 | 0.873 | 0.7 | 123 | 118,500 | 2.4 | 111 | 101 |
| Example 3 | 0.876 | 0.7 | 124 | 114,300 | 2.5 | 114 | 101 |
| Example 4 | 0.869 | 1.8 | 123 | 103,200 | 2.5 | 98 | 101 |
| Example 5 | 0.881 | 0.5 | 123 | 130,400 | 2.6 | 117 | 102 |
| Example 6 | 0.880 | 0.6 | 124 | 121,400 | 2.5 | 116 | 101 |
| Example 7 | 0.881 | 0.4 | 124 | 123,200 | 2.5 | 119 | 101 |
| Example 8 | 0.871 | 1.0 | 124 | 109,400 | 2.5 | 104 | 101 |
| Example 9 | 0.872 | 2.9 | 124 | 911,700 | 2.8 | 111 | 102 |
| Example 10 | 0.877 | 3.6 | 123 | 81,500 | 2.9 | 113 | 103 |

*For the copolymer of Comparative Example 1, the number of SCBs was less than the measurement limit, so the dY/dX value and the range of the number of SCBs were immeasurable.

Referring to Table 3, the block copolymers of the Examples 1 to 10 showed excellences in heat resistance, processability, and elasticity, while the copolymer of the Comparative Example 1 substantially had no elasticity and hence none of the characteristics as an elastomer. Further, the copolymer of the Comparative Example 2 considered as an ethylene/1-octene random copolymer was far interior in heat resistance (lower melting temperature and lower TMA) to the block copolymers of the Examples.

Example 11

1.0 L of a hexane solvent and 0.7M 1-octene were added into a 2 L autoclave reactor, which was then preheated up to 120° C. To a 25 mL catalyst storage tank were sequentially added 1.0 μmol of catalyst A (the same one as used in Examples 1 to 9) treated with 125 μmol of the triisobutylaluminum compound, 5.0 μmol of catalyst B (the same one as used in Examples 1 to 9), and 30 μmol of the trityl tetrakis(pentafluorophenyl)borate cocatalyst. In this regard, an ethylene pressure of 30 bar was imposed into the catalyst storage tank, and a high-pressure argon (Ar) gas was used to inject 1 μmol of the catalyst A, 5 μmol of the catalyst B, and 600 μmol of diethyl zinc as a polymerization aid into the reactor to cause a copolymerization reaction for 10 minutes. After removal of the remaining ethylene gas from the reactor, the polymer solution was added to an excess of ethanol to induce precipitation. The polymer product thus obtained was washed with ethanol and acetone each two or three times and then dried in a vacuum oven at 80° C. for 12 hours or longer. The resultant product was a block copolymer of Example 11.

Example 12

The procedures were performed in the same manner as described in Example 11, excepting that 4 μmol of the catalyst A and 2 μmol of the catalyst B were used to prepare a block copolymer of Example 12.

Example 13

The procedures were performed in the same manner as described in Example 11, excepting that 3 μmol of the catalyst A and 3 μmol of the catalyst B were used to prepare a block copolymer of Example 13.

Example 14

The procedures were performed in the same manner as described in Example 11, excepting that 2 μmol of the catalyst A and 4 μmol of the catalyst B were used to prepare a block copolymer of Example 14.

Example 15

The procedures were performed in the same manner as described in Example 11, excepting that 1 μmol of the catalyst A and 5 μmol of the catalyst B were used to prepare a block copolymer of Example 15.

Comparative Example 3

1.0 L of a hexane solvent and 0.7M 1-octene were added into a 2 L autoclave reactor, which was then preheated up to 120° C. To a 25 mL catalyst storage tank were sequentially added 6.0 μmol of catalyst A treated with 125 μmol of the triisobutylaluminum compound and 30 μmol of the trityl tetrakis(pentafluorophenyl)borate cocatalyst. In this regard, an ethylene pressure of 30 bar was imposed into the catalyst storage tank, and a high-pressure argon (Ar) gas was used to inject 6.0 μmol of the catalyst A into the reactor to cause a copolymerization reaction for 10 minutes. After removal of the remaining ethylene gas from the reactor, the polymer solution was added to an excess of ethanol to induce precipitation. The polymer product thus obtained was washed with ethanol and acetone each two to three times and then dried in a vacuum oven at 80° C. for 12 hours or longer. The resultant product was an ethylene/α-olefin copolymer of Comparative Example 3.

Comparative Example 4

The procedures were performed in the same manner as described in Comparative Example 3, excepting that 5 μmol of the catalyst A was used to prepare a block copolymer of Comparative Example 4.

Comparative Example 5

The procedures were performed in the same manner as described in Comparative Example 3, excepting that 4 μmol of the catalyst A was used to prepare a block copolymer of Comparative Example 5.

Comparative Example 6

The procedures were performed in the same manner as described in Comparative Example 3, excepting that 3 μmol of the catalyst A was used to prepare a block copolymer of Comparative Example 6.

Comparative Example 7

The procedures were performed in the same manner as described in Comparative Example 3, excepting that 0.6 M of 1-octene was used to prepare a block copolymer of Comparative Example 7.

Comparative Example 8

The procedures were performed in the same manner as described in Comparative Example 3, excepting that 0.5 M of 1-octene was used to prepare a block copolymer of Comparative Example 8.

Comparative Example 9

The procedures were performed in the same manner as described in Comparative Example 3, excepting that 0.4 M of 1-octene was used to prepare a block copolymer of Comparative Example 9.

Experimental Example 2

The copolymers prepared in the Examples 11 to 15 and Comparative Examples 3 to 9 were evaluated in regards to the properties according to the methods as described below. The evaluation results are presented in FIG. 2 and Table 4.

1) Analysis on the Content of the Ethylene Repeating Unit

The copolymers of Examples and Comparative Examples were analyzed in regards to the content of the ethylene repeating unit by using $^1$H-NMR spectroscopy.

2) Analysis on the Content of the Hard Segment

The content of the hard segment in Examples and Comparative Examples was calculated using the time domain NMR instrument (TD NMR; Minspec™ manufactured by Optics) commercially available. Firstly, the TD NMR instrument was adopted to measure the FDI (Free Induction Decay) for the samples of the Examples and the Comparative Examples. The measurement results were as depicted, for example, in FIG. 3. As shown in FIG. 3, FID is the function of time and intensity. The four constants, such as A, B, $T2_{fast}$, and $T2_{slow}$, in the Mathematical Formula 2 were varied to elicit a functional formula most approximating the FID functional graph, thereby determining A, B, $T2_{fast}$, and $T2_{slow}$ values of each sample.

It is known that the T2 (spin-spin relaxation time) relaxation for the hard segment as calculated from the functional formula appears fast, while the T2 relaxation for the soft segment is slow. Hence, among the calculated values of A, B, $T2_{fast}$, and $T2_{slow}$, the lower T2 value was determined as the T2 value of the hard segment, that is, $T2_{fast}$, while the higher T2 value was determined as the T2 value of the soft segment, that is, $T2_{slow}$. Through this procedure, the content (wt. %) of the hard segment as well as the constants of A and B was calculated.

Intensity=$A \times EXP(-Time/T2_{fast}) + B \times EXP(-Time/T2_{slow})$ [Mathematical Formula 2]

Determine A, B, $T2_{fast}$, and $T2_{slow}$ by fitting.

Hard segment (wt. %)=$A/(A+B) \times 100$

In the Mathematical Formula 2, intensity and time are values calculated through the FID analysis; $T2_{fast}$ is the T2 (spin-spin relaxation time) relaxation value for the hard segment; and $T2_{slow}$ is the T2 (spin-spin relaxation time) relaxation value for the soft segment. A and B, which are constants determined by the fitting process, indicate the relative proportions of the hard and soft segments, respectively, and have values proportionate to the contents of the respective segments.

Figure 2:
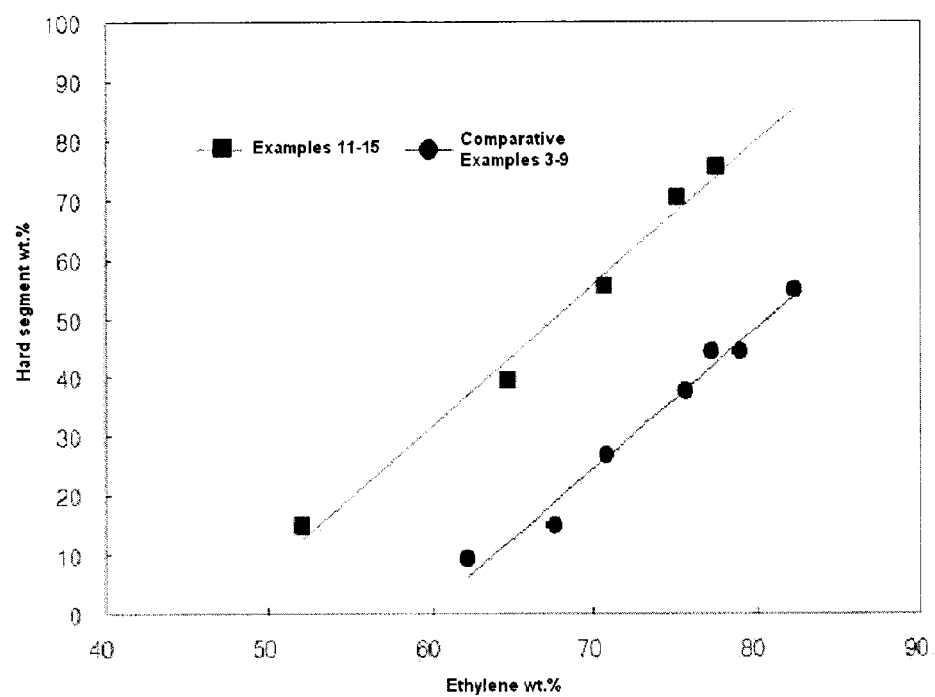
FIG. 2 is a linear regression graph showing the relationship between the content Y' (wt. %) of hard segment and the content X' (wt. %) of the ethylene or propylene repeating unit contained in each olefin block copolymer of Examples 11 to 15 in comparison with the copolymers of Comparative Examples 3 to 9.

3) Determination of Relational Expression Between Content Y' (Wt. %) of Hard Segment and Content X' (Wt. %) of Ethylene or Propylene Repeating Unit According to the above-described method, content Y' (wt. %) of the hard segment and the content X' (wt. %) of the ethylene or propylene repeating unit in the block copolymer were respectively calculated, and the content Y' (wt. %) of the hard segment as a function of the content X' (wt. %) of the ethylene or propylene repeating unit was then determined. Those data were applied to the linear regression analysis to obtain the relational expression between them in the form of a linear function. Such a linear function resulted in the respective equations as given by Y=2.4143X−113.23 ($R^2$=9878) and Y=2.3567X−140.32 ($R^2$=0.9795), respectively, for the Examples 11 to 15 and the Comparative Examples 3 to 9. The results are depicted in FIG. 2.

This shows that the copolymers of the Examples satisfied the Mathematical Formula 1 as given by Y'≥2.8495X'−145.01 in the region containing a predetermined content of the ethylene repeating unit. Contrarily, the copolymers of the Comparative Examples hardly satisfied the Mathematical Formula 1. In addition, the copolymers of the Examples had a considerably high content of the hard segment even with the same content of the ethylene repeating unit, so they had a very high degree of blocking of hard and soft segments.

On the other hand, the copolymers prepared in the Examples 11 to 15 and Comparative Examples 3 to 9 were also evaluated in regards to density, melting temperature (Tm), molecular weight (Mw), molecular weight distribution, and TAM. The evaluation results are presented in Table 4.

TABLE 4

| | Content of ethylene repeating unit (wt. %) | Content of hard segment (wt. %) | Density (g/cm³) | Tm (□) | Mw | Molecular weight distribution | TMA (□) |
|---|---|---|---|---|---|---|---|
| Example 11 | 52.1 | 14.8 | 0.860 | 123.2 | 71595 | 2.4 | 105 |
| Example 12 | 64.7 | 39.3 | 0.868 | 124.7 | 82375 | 2.5 | 112 |
| Example 13 | 70.7 | 55.3 | 0.875 | 125.3 | 88779 | 2.6 | 120 |
| Example 14 | 75.2 | 70.4 | 0.881 | 126.7 | 92324 | 2.6 | 121 |
| Example 15 | 77.5 | 75.4 | 0.887 | 127.1 | 117524 | 2.6 | 125 |
| Comparative Example 3 | 62.3 | 9.2 | 0.863 | 60.1 | 75894 | 2.3 | 50 |
| Comparative Example 4 | 67.6 | 14.8 | 0.869 | 62.3 | 77264 | 2.5 | 52 |
| Comparative Example 5 | 70.8 | 26.9 | 0.873 | 65.1 | 80458 | 2.6 | 53 |
| Comparative Example 6 | 75.6 | 37.4 | 0.875 | 67.3 | 84549 | 2.7 | 56 |
| Comparative Example 7 | 77.3 | 44.2 | 0.882 | 70.4 | 88789 | 2.7 | 60 |
| Comparative Example 8 | 79.0 | 44.2 | 0.889 | 72.1 | 89354 | 2.7 | 63 |
| Comparative Example 9 | 82.3 | 54.5 | 0.895 | 75.7 | 98357 | 2.8 | 71 |

Referring to Table 4, the block copolymers of the Examples 11 to 15 had considerably higher values of the melting temperature and the TMA, showing higher heat resistance, in comparison with the block copolymers of the Comparative Examples 3 to 9. In addition, the block copolymers of the Examples exhibited excellences in mechanical properties and processability pertaining to high molecular weight and high molecular weight distribution.

What is claimed is:

1. An olefin block copolymer comprising a plurality of blocks or segments, each comprising an ethylene or propylene repeating unit and an α-olefin repeating unit at different weight fractions, wherein a first derivative of the number Y of short-chain branches (SCBs) per 1,000 carbon atoms of each polymer chain contained in the block copolymer with respect to the molecular weight X of the polymer chains is a negative or positive number of $-1.5 \times 10^{-4}$ or greater; and the first derivative is from $-1.0 \times 10^{-4}$ to $1.0 \times 10^{-4}$ in a region corresponding to the median of the molecular weight X or above.

2. The olefin block copolymer as claimed in claim 1, wherein the first derivative is greater in a region below the median of the molecular weight X than in the region corresponding to the median of the molecular weight X or above.

3. The olefin block copolymer as claimed in claim 2, wherein the first derivative decreases with an increase in the molecular weight X in the region below the median of the molecular weight X.

4. The olefin block copolymer as claimed in claim 2, wherein the first derivative is from $2.0 \times 10^{-4}$ to 0.1 in a region where the molecular weight X is in the bottom less than 40%.

5. The olefin block copolymer as claimed in claim 1, wherein the number Y of short-chain branches (SCBs) per 1,000 carbon atoms of the polymer chains is 70 or less.

6. The olefin block copolymer as claimed in claim 1, wherein the number Y of short-chain branches (SCBs) per 1,000 carbon atoms of the polymer chains is from 20 to 70 in the region corresponding to the median of the molecular weight X or above, wherein the deviation of the maximum and minimum values for Y in the region is 20 or less.

7. The olefin block copolymer as claimed in claim 1, wherein the block copolymer comprises a hard segment comprising a first weight fraction of the α-olefin repeating unit and a soft segment comprising a second weight fraction of the α-olefin repeating unit, wherein the second weight fraction is greater than the first weight fraction.

8. The olefin block copolymer as claimed in claim 7, wherein the weight fraction of the α-olefin repeating unit contained in the entire block copolymer has a value between the first and second weight fractions.

9. The olefin block copolymer as claimed in claim 7, wherein the content Y' (wt. %) of the hard segment and the content X' (wt. %) of the ethylene or propylene repeating unit in the block copolymer satisfy Mathematical Formula 1 as follows:

$$Y' > 2.8495 X' - 145.01 \qquad \text{[Mathematical Formula 1]}.$$

10. The olefin block copolymer as claimed in claim 9, wherein the olefin block copolymer comprises 50 to 90 wt. % of the ethylene or propylene repeating unit and a remaining content of the α-olefin repeating unit and satisfies the Mathematical Formula 1 in terms of the entire content range of the repeating units.

11. The olefin block copolymer as claimed in claim 7, wherein the olefin block copolymer comprises 10 to 90 wt. % of the hard segment and a remaining content of the soft segment.

12. The olefin block copolymer as claimed in claim 7, wherein the hard segment has a higher value than the soft segment in at least one property of the degree of crystallization, density, and melting temperature.

13. The olefin block copolymer as claimed in claim 1, wherein the olefin block copolymer has a density of 0.85 to 0.92 g/cm$^3$.

14. The olefin block copolymer as claimed in claim 1, wherein the olefin block copolymer has a value of thermal mechanical analysis (TMA) of 70 to 140° C.

15. The olefin block copolymer as claimed in claim 1, wherein the olefin block copolymer has a melt index of 0.5 to 5 g/10 min under a load of 2.16 kg at 190° C. and a Shore hardness of 50 to 100.

16. The olefin block copolymer as claimed in claim 1, wherein the olefin block copolymer has a permanent recovery (after 300% elongation) of 110% or less.

17. The olefin block copolymer as claimed in claim 1, wherein the olefin block copolymer has a melting temperature of 100 to 140° C.

18. The olefin block copolymer as claimed in claim 1, wherein the olefin block copolymer has a weight average molecular weight of 50,000 to 200,000 and a molecular weight distribution of 2.0 to 4.5.

19. The olefin block copolymer as claimed in claim 1, wherein the α-olefin repeating unit is a repeating unit derived from at least one α-olefin selected from the group consisting of 1-butene, 1-pentene, 4-methyl-1-pentene, 1-hexene, 1-heptene, 1-octene, 1-decene, 1-undecene, 1-dodecene, 1-tetradecene, 1-hexadecene, and 1-itocene.

\* \* \* \* \*